(12) United States Patent
Tkachuk et al.

(10) Patent No.: US 7,117,218 B2
(45) Date of Patent: Oct. 3, 2006

(54) SYSTEM AND METHOD FOR EXPRESSING AND CALCULATING A RELATIONSHIP BETWEEN MEASURES

(75) Inventors: Richard Tkachuk, Sammamish, WA (US); Cristian Petculescu, Redmond, WA (US); Amir Netz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 10/607,087

(22) Filed: Jun. 26, 2003

(65) Prior Publication Data

US 2004/0267765 A1 Dec. 30, 2004

(51) Int. Cl.
*G06F 7/00* (2006.01)
(52) U.S. Cl. .......................................... 707/100; 707/3
(58) Field of Classification Search .................. 707/5, 707/10, 103 Y, 200, 2, 3, 103, 100; 705/36 R
See application file for complete search history.

(56) References Cited

U.S. PATENT DOCUMENTS

| | | | | |
|---|---|---|---|---|
| 5,799,300 | A | * | 8/1998 | Agrawal et al. ............... 707/5 |
| 5,890,151 | A | * | 3/1999 | Agrawal et al. ............... 707/5 |
| 5,926,820 | A | * | 7/1999 | Agrawal et al. ............ 707/200 |
| 6,163,774 | A | * | 12/2000 | Lore et al. ................ 705/36 R |
| 6,453,321 | B1 | * | 9/2002 | Hill et al. ................ 707/103 Y |
| 6,477,536 | B1 | | 11/2002 | Pasumansky et al. ........ 707/102 |
| 6,601,062 | B1 | * | 7/2003 | Deshpande et al. ............. 707/3 |
| 6,931,418 | B1 | * | 8/2005 | Barnes ......................... 707/10 |
| 2002/0099691 | A1 | * | 7/2002 | Lore et al. ...................... 707/2 |

OTHER PUBLICATIONS

Espil, M.M. et al., "Efficient Intensional Redefinition of Aggregation Hierarchies in Multidimensional Dayabases", *DOLAP*, Nov. 9, 2001, 8 pages.
Harinarayan, V. et al., "Implementing Data Cubes Efficiently", *SIGMOD*, 1996, 205-216.
Hurtado, C.A. et al., "Updating OLAP Dimensions", *DOLAP*, 1999, 60-66.
Niemi, T. et al., "Constructing OLAP Cubes Based on Queries", *DOLAP*, Nov. 9, 2001, 9-15.
Pourabbas, E. et al., "Characterization of Hierarchies and Some Operations in OLAP Environment", *DOLAP*, 1999, 54-59.
Han, J. et al., "Data Mining: Concepts and Techniques", *Data Mining: Concepts and Techniques*, 2001, 5-15, 23, 45, XP-002332057.

* cited by examiner

*Primary Examiner*—Sam Rimell
*Assistant Examiner*—Paul Kim
(74) *Attorney, Agent, or Firm*—Woodcock Washburn LLP (57) ABSTRACT

A measure expression may include a relationship between measures defined by an arithmetic operation. A query may request a calculation of the measure expression over a selected range of attributes. The request may be processed by retrieving all rows comprising data within the selected range of attributes for each measure in the expression through a single access to an associated table.

15 Claims, 9 Drawing Sheets

| Sales 300 | | | |
|---|---|---|---|
| Customer ID 310 | Country 320 | Month 330 | Sales Amount 340 |
| 1 | Mex | Jan | 1.00 |
| 1 | Mex | Feb | 3.00 |
| 1 | Mex | March | 5.00 |
| 2 | Mex | Jan | 2.00 |
| 2 | Mex | Feb | 4.00 |
| 2 | Mex | March | 6.00 |
| 1 | Can | Jan | 6.00 |
| 1 | Can | Feb | 4.00 |
| 1 | Can | March | 2.00 |
| 2 | Can | Jan | 5.00 |
| 2 | Can | Feb | 3.00 |
| 2 | Can | March | 1.00 |

Fig. 4

| Exchange 400 | | |
|---|---|---|
| Country 410 | Month 420 | Exchange Rate 430 |
| Mex | Jan | 1.5 |
| Mex | Feb | 1 |
| Mex | March | 2 |
| Can | Jan | 2 |
| Can | Feb | 1 |
| Can | March | 1.5 |

| First Cache 600 | | | |
|---|---|---|---|
| Customer ID 610 | Country 620 | Month 630 | Sales Amount 640 |
| 1 | Mex | Jan | 1.00 |
| 1 | Mex | Feb | 3.00 |
| 1 | Mex | March | 5.00 |

Fig. 7

| First Index 700 |||
|---|---|---|
| Country 710 | Month 720 | Sales Amount 730 |
| Mex | Jan | 1.00 |
| Mex | Feb | 3.00 |
| Mex | March | 5.00 |

Fig. 8

| Second Cache 800 |||
|---|---|---|
| Country 810 | Month 820 | Exchange Rate 830 |
| Mex | Jan | 1.5 |
| Mex | Feb | 1 |
| Mex | March | 2 |

Fig. 9

| Calculation 900 ||||| 
|---|---|---|---|---|
| Country 910 | Month 920 | Sales Amount 930 | Exchange Rate 940 | US Sales 950 |
| Mex | Jan | 1.00 | 1.5 | $1.50 |
| Mex | Feb | 3.00 | 1 | $3.00 |
| Mex | March | 5.00 | 2 | $10.00 |
| TOTAL FOR FIRST QUARTER |||| $14.50 |

SYSTEM AND METHOD FOR EXPRESSING AND CALCULATING A RELATIONSHIP BETWEEN MEASURES

FIELD OF THE INVENTION

The present invention relates to the field of data analysis services, and, more specifically, to expressing and calculating a relationship among measures of data.

BACKGROUND OF THE INVENTION

Online analytical processing (OLAP) is a key part of many data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, an OLAP cube may be modeled according to a user's perception of the data. A cube may organize a data type according to dimensions, each dimension modeled according to an attribute of the data type. For example, a cube may organize "Sales" data according to the dimensions "Customer", "Location" and "Time." Typically, there is a hierarchy associated with each dimension. The hierarchy includes levels of granularity. For example, the time dimension can consist of years subdivided into quarters subdivided into months subdivided into weeks subdivided into days. The years level is the broadest level of granularity, while the days level is the finest level of granularity. Dimension members act as indices for identifying a particular cell or range of cells within the cube. The cube may also have measures, which measure a data type according to its attributes. For example, the "Sales" cube may have a measure "Sales Amount", which is the amount of sales made in source currencies of a corresponding location.

OLAP services are often used to analytically model data that is stored in a relational database such as, for example, an Online Transactional Processing (OLTP) database. Data stored in such a relational database may be organized according to multiple tables. Each such table may organize a data type according to columns corresponding to attributes and measures. For example, the "Sales" cube may be modeled according to a "Sales" table with columns corresponding to attributes "Customer", "Location", and "Time" and measure "Sales Amount". Furthermore, an "Exchange" table may include columns corresponding to attributes "Location" and "Time" and measure "Exchange Rate", with "Exchange Rate" being the rate of conversion of a source currency of a corresponding location into US currency.

It is often desirable to calculate relationships between different measures. For example, it may be desirable to calculate the product of the "Sales Amount" measure from the "Sales" table and the "Exchange Rate" measure of the "Exchange" table to convert sales from a source currency into US currency. Such a relationship between measures is first calculated at the finest level of granularity for which data is available, and then the calculated results are subsequently aggregated to produce results for a broader selected range. For example, if the finest level of granularity for both "Sales" data and the "Exchange" data is the month level, then a request to convert Mexican and Canadian currency sales into US currency sales for a quarter is calculated for each of the two source currencies in each of the three months of the quarter, resulting in six separate calculations. The six calculations are subsequently aggregated to provide total Mexican and Canadian sales in US currency for the entire quarter.

In conventional OLAP systems, data for each measure must be separately accessed for each calculation from each table on a row by row basis. For example, to convert Mexican and Canadian sales for the quarter, the "Sales" table and the "Exchange" table must each be separately accessed six times for each of the six rows involved in the calculation. Such separate access on a row by row basis may significantly prolong the amount of time required to perform complex calculations. Thus, there is a need in the art for systems and methods for calculating a relationship between measures in which the relationship is not calculated on a row by row basis.

SUMMARY OF THE INVENTION

A measure expression may include a relationship between a plurality of measures defined by an arithmetic operation. Each measure within the expression may correspond to an associated data type. Data for each data type may be stored in an associated data table. A request may be received to calculate the measure expression over a selected range of attributes.

In an embodiment of the invention, the request is processed by retrieving a plurality of caches each corresponding to an associated measure in the expression. Each such cache may include all rows comprising data for the associated measure over the selected range of attributes. All such rows may be retrieved through a single access to the associated data table.

A plurality of indices may be generated each corresponding to an associated cache. Each such index may include data for the associated measure over the selected range of attributes common to every measure in the expression. Such data may be aggregated by attributes specific to the associated data type.

The arithmetic operation in the measure expression may be performed on the data from each index on a row by row basis to achieve resulting data, and the resulting data may be aggregated over the selected range of attributes common to every measure in the expre0ssion. The aggregated resulting data may provide the total measure expression over the selected range of attributes.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

Systems and methods that meet the above-mentioned objects and provide other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

Figure 1:
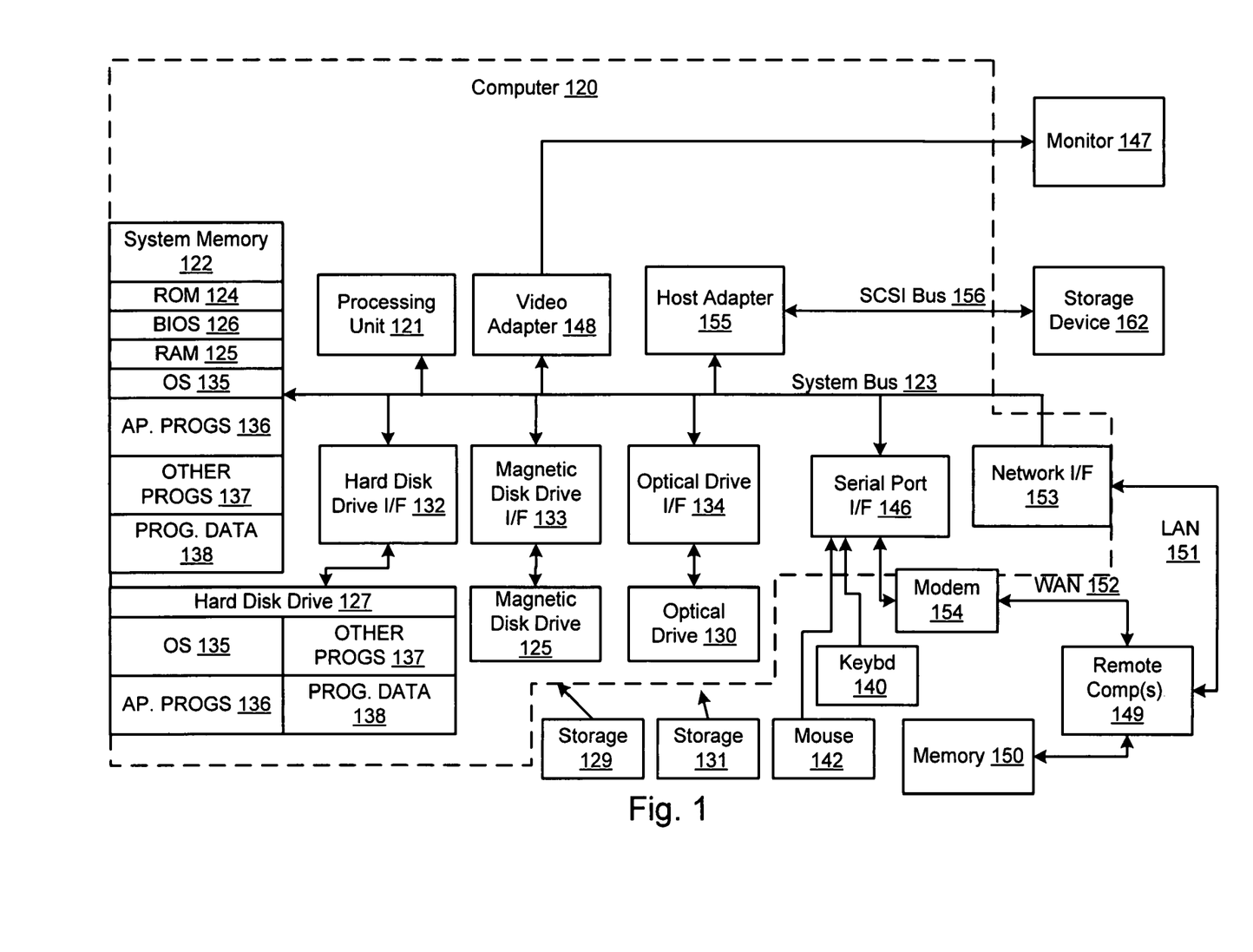
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, if should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Systems and Methods of the Present Invention

Figure 2:
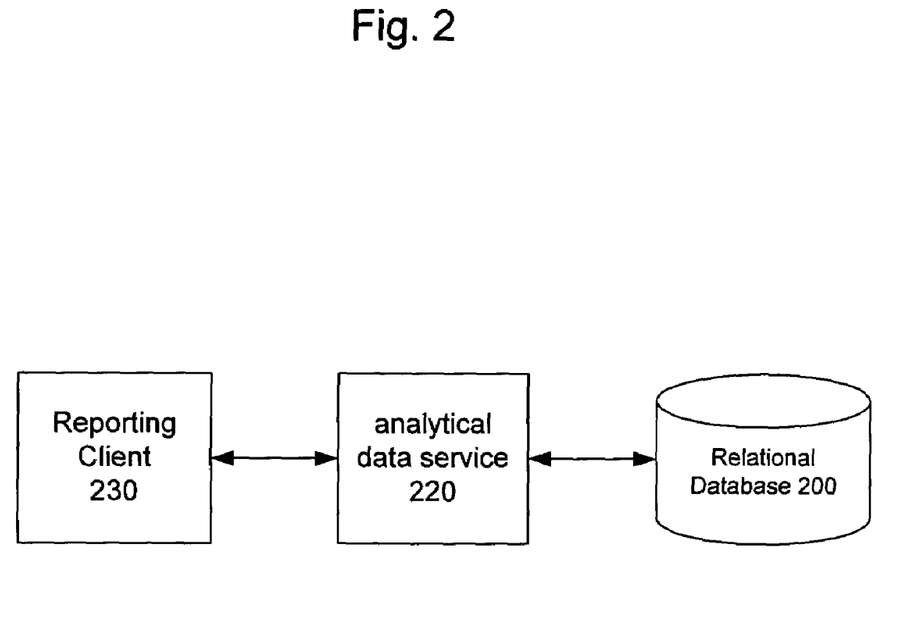
FIG. 2 is a block diagram of an exemplary system for analytically modeling data in accordance with the present invention.

An exemplary system for analytically modeling data in accordance with the present invention is shown in FIG. 2. As shown, an analytical data service 220 such as, for example, an On-Line Analytical Processing (OLAP) service may be employed to model data stored in a relational database 200 such as, for example, an On-Line Transactional Database (OLTP). Analytical data service 220 may present analytically modeled data via reporting client 230. As set forth previously, data stored in relational database 200 may be organized according to multiple tables, with each table including data corresponding to a particular data type. A table corresponding to a particular data type may be organized according to columns corresponding to data attributes and measures.

Figure 3:
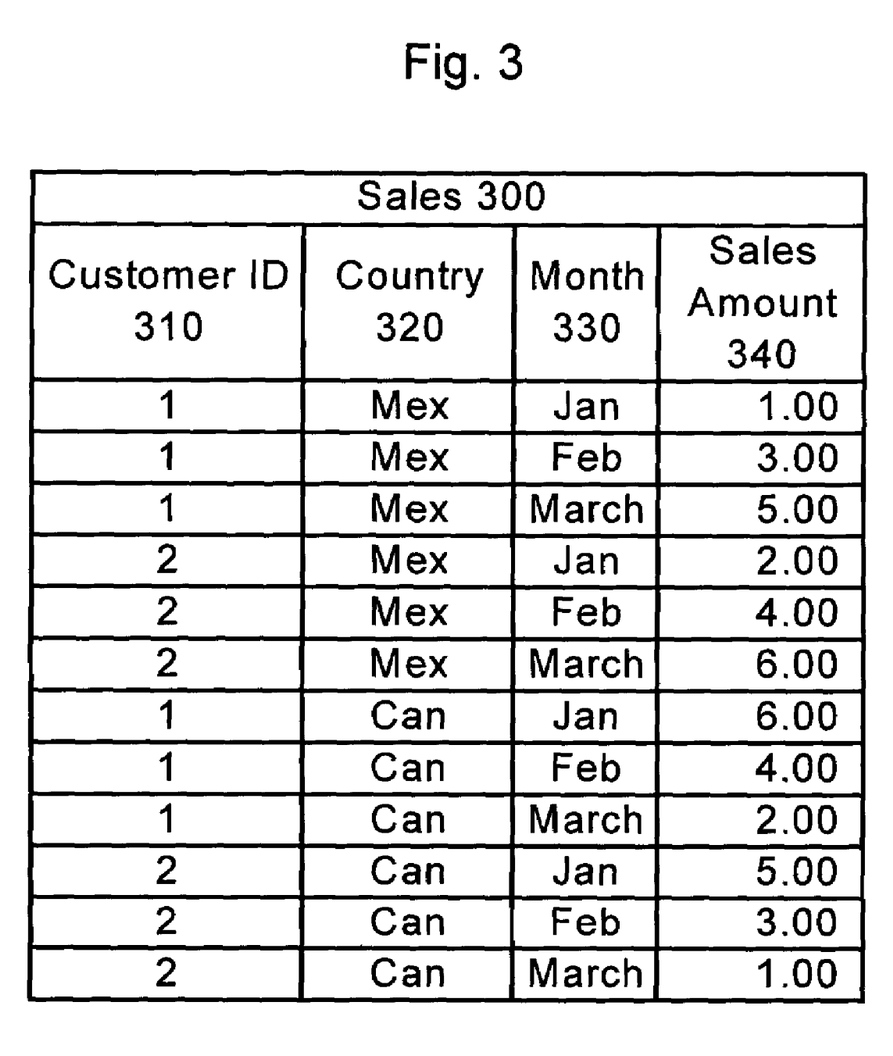
FIG. 3 is a sample relational database table corresponding to "Sales" data in accordance with the present invention.

One such table is shown in FIG. 3, with a "Sales" data type organized in a "Sales" table 300 with columns "Customer ID" 310, "Country" 320, "Month" 330, and "Sales Amount" 340. "Customer ID" column 310, "Country" column 320, and "Month" column 330 are attribute columns that provide the attributes of the "Sales" data type at the finest granularity for which data is available. Specifically, "Customer ID" 310 is the finest granularity for a customer attribute of the "Sales" data type; "Country" 320 is the finest granularity for a location attribute of the "Sales" data type; and "Month" 310 is preferably the finest granularity for a time attribute of the "Sales" data type. "Sales Amount" column 340 is a measure column that includes data for the measure "Sales Amount" according to customers, countries, and months in "Customer ID" column 310, "Country" column 320, and "Month" column 330, respectively. "Sales Amount" 340 is the amount of sales made in source currencies of corresponding countries.

Figure 4:
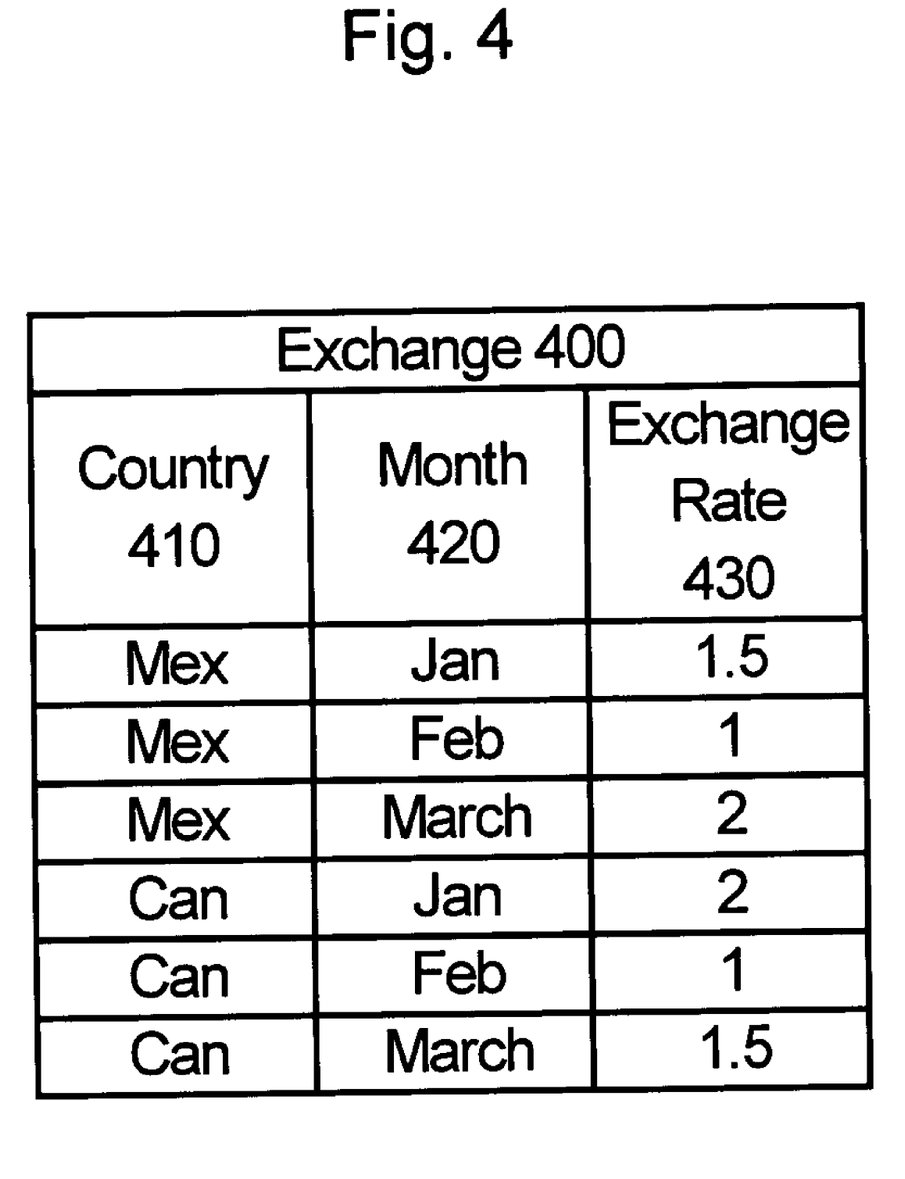
FIG. 4 is a sample relational database table corresponding to "Exchange" data in accordance with the present invention.

Referring now to FIG. 4, an "Exchange" data type is organized in an "Exchange" table 400 with columns "Country" 410, "Month" 420, and "Exchange Rate" 430. "Country" column 410 and "Month" column 420 are attribute columns that provide the attributes of the "Exchange" data type at the finest granularity for which data is available. Specifically, "Country" 410 is the finest granularity for a location attribute of the "Exchange" data type; and "Month" 420 is the finest granularity for a time attribute of the "Exchange" data type. "Exchange Rate" column 430 is a measure column that includes data for the measure "Exchange Rate" according to countries and months in "Country" column 410 and "Month" column 420, respectively. "Exchange Rate" 340 is the rate of converting a source currency into US currency.

Analytical data service 220 in accordance with the present invention enables a measure expression to be defined for a plurality of measures such as, for example, "Sales Amount" measure 340 from "Sales" table 300 and "Exchange Rate" measure 430 from "exchange" table 400. The measure expression includes a relationship between the plurality of measures defined by an arithmetic operation. For example, a measure expression "US Sales" may be defined as the product of the measure "Sales Amount" 340 and the measure "Exchange Rate" 430 as shown below:

$$(\text{US Sales})_{ME} = (\text{Sales Amount})_M * (\text{Exchange Rate})_M$$

The measures included in the measure expression need not necessarily measure data types with common attributes. For example, the customer attribute of the "Sales" data type is not an attribute of the "Exchange" data type.

Analytical data service 220 may receive and process a query requesting a calculation of a measure expression for a selected range of attributes. An exemplary method for processing such a query in accordance with an embodiment of the present invention is set forth below with reference to FIG. 5. Although a measure expression may include a relationship between any number of measures, the method set forth below is described with reference to a measure expression including two measures. Importantly, however, the method set forth below is not limited to a measure expression including two measures. The method may be applied to a measure expression including more than two measures by propagating the processing steps to the additional measures in the expression.

Generally, data within a selected range of attributes for measures in the expression may be retrieved from database 200 and cached. Importantly, because the measure expression is defined as a relationship between measures, all rows comprising data within the selected range of attributes for each measure in the expression may be retrieved and cached through a single access to a corresponding data table. For example, to calculate "US Sales", all rows comprising data within the selected range of attributes for "Sales Amount" measure 340 may be retrieved and cached through a single access to "Sales" table 300, while all rows comprising data within the selected range of attributes for "Exchange Rate" measure 430 may be retrieved and cached through a single access to "Exchange" table 400. Such a single access to retrieve multiple rows of data is preferable to multiple accesses to retrieve data on a row by row basis. Reducing the number accesses to data tables may significantly reduce the amount of time required to process the request.

Figure 5:
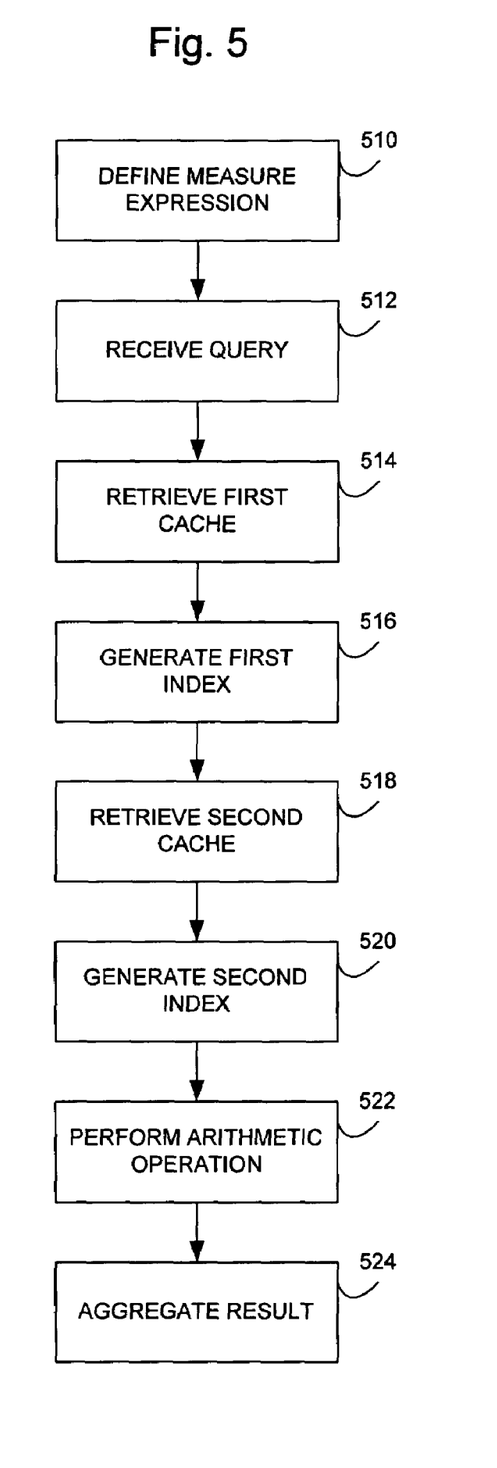
FIG. 5 is a flowchart of an exemplary method for calculating a measure expression in accordance with the present invention.

Referring now to FIG. 5, at step 510, a measure expression is defined at analytical data service 220. The measure expression may be defined as an arithmetic operation performed on a first measure and a second measure. For example, the "US sales" measure set forth above is defined as the product of a first measure "Sales Amount" 340 and a second measure "Exchange Rate" 430.

At step 512, a query is received at analytical data service 220 requesting a calculation of the measure expression for a selected range of attributes. For example, a query may request a calculation of "US Sales" for Mexican locations for customer "1" for a first quarter (January, February, and March).

Figure 6:
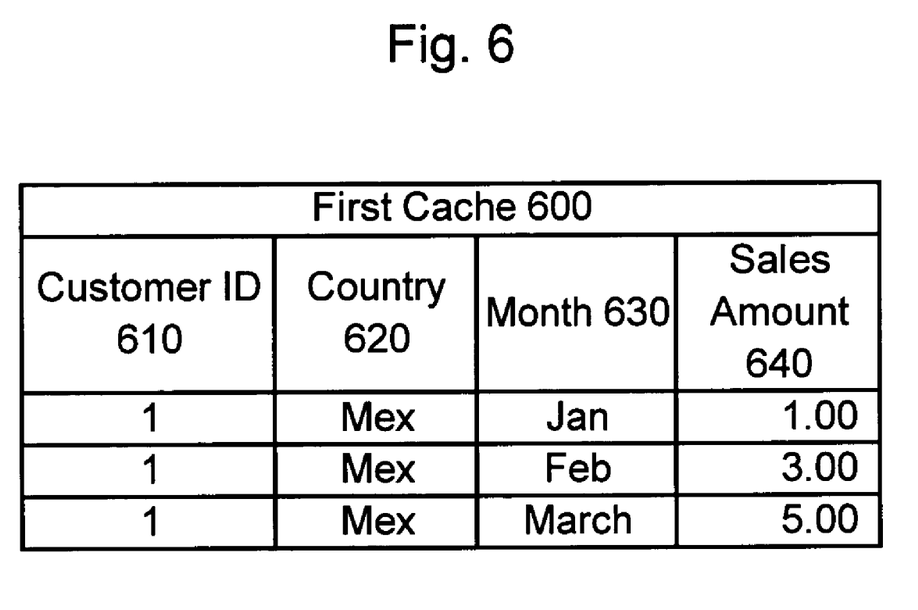
FIG. 6 is an exemplary first cache in accordance with the present invention.

At step 514, a first cache is retrieved from a first data table in database 200 corresponding to the first data type. The first cache includes data for the first measure over the selected range of attributes. An exemplary first cache 600 corresponding to the measure expression "US Sales" is shown in FIG. 6. First cache 600 is retrieved from "Sales" table 300 and includes "Customer ID" column 610, "Country" column 620, "Month" column 630, and "Sales Amount" column 640. "Customer ID" column 610 includes entries for Customer "1" only, which comprises the selected range of customer attributes. "Country" column 620 includes entries for Mexico only, which comprises the selected range of location attributes. "Month" column 630 includes entries for January, February, and March only, which comprise the selected range of time attributes. "Sales Amount" column 640 is a measure column that includes data for the measure "Sales Amount" 340 according to customers, countries, and months in "Customer ID" column 610, "Country" column 620, and "Month" column 630, respectively. Importantly, all rows in first cache 600 may be compiled through only a single access to "Sales" table 300.

Figure 7:
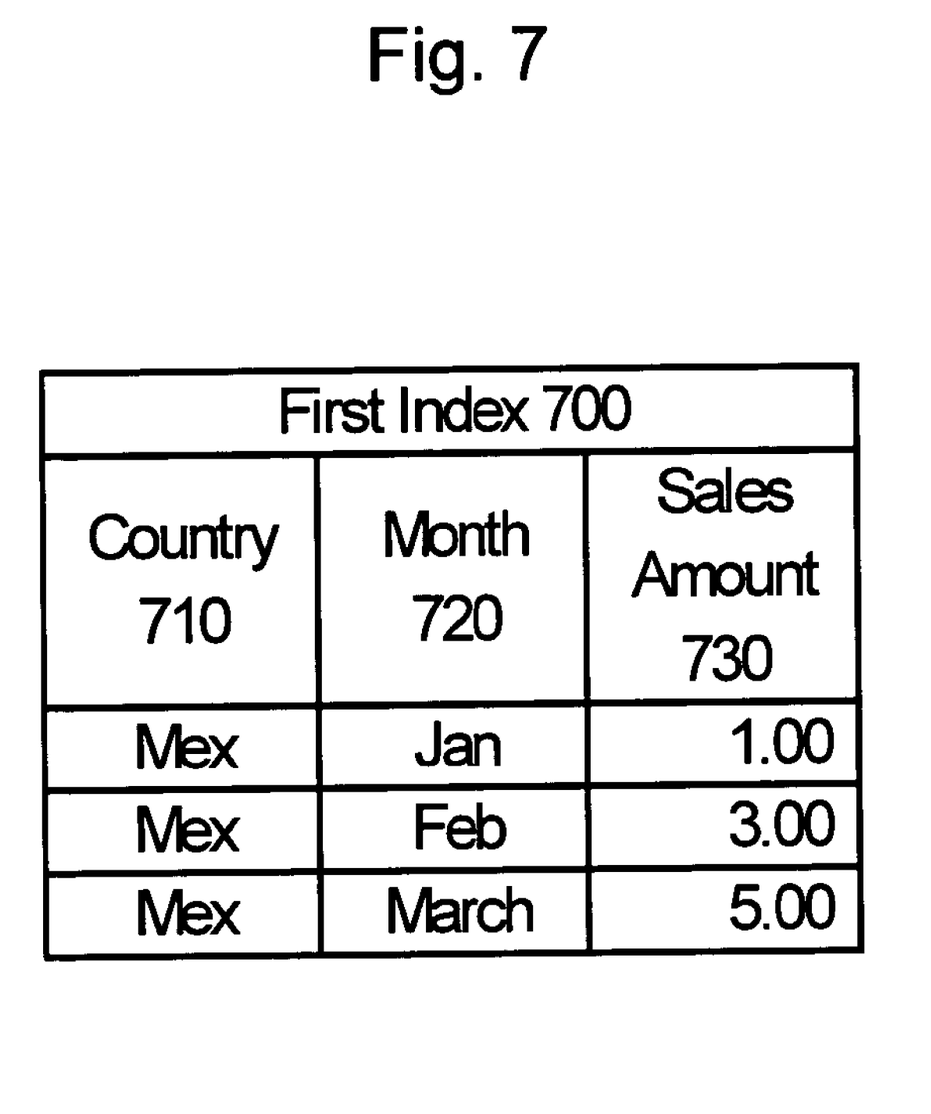
FIG. 7 is an exemplary first index in accordance with the present invention.

At step 516, a first index is generated from the first cache. The first index includes data for the first measure over the selected range of attributes common to the first data type and the second data type. Consequently, in the first index, data for the first measure is aggregated by attributes specific to the first data type. An exemplary first index 700 corresponding to the measure expression "US Sales" is shown in FIG. 7. First index 700 includes "Country" column 710, "Month" column 720, and "Sales Amount" column 730. "Country" column 710 and "Month" column 720 are attribute columns corresponding to attributes common to both the "Sales" data type and the "Exchange" data type. As should be appreciated, a "Customer ID" column 610 is included in first cache 600 but is not included in first index 700 as it is specific to the "Sales" data type. "Sales Amount" column 730 is a measure column that includes data for the measure "Sales Amount" 340 according to countries and months in "Country" column 710 and "Month" column 720, respectively.

Data in "Sales Amount" column 730 is aggregated to include sales for Customer "1" only, which comprises the selected range of customers. Specifically, as shown in "Sales" table 300, 3.00 pesos of sales were made in Mexico in January, 1.00 peso of which were made to Customer "1" and 2.00 pesos of which were made to Customer "2". Consequently, first index 700 shows that only 1.00 peso of sales were made in Mexico in January, to reflect the 1.00 peso of sales made to Customer "1" and not reflect the 2.00 pesos of sales made to Customer "2", as Customer "2" is not within the selected range of customers.

Figure 8:
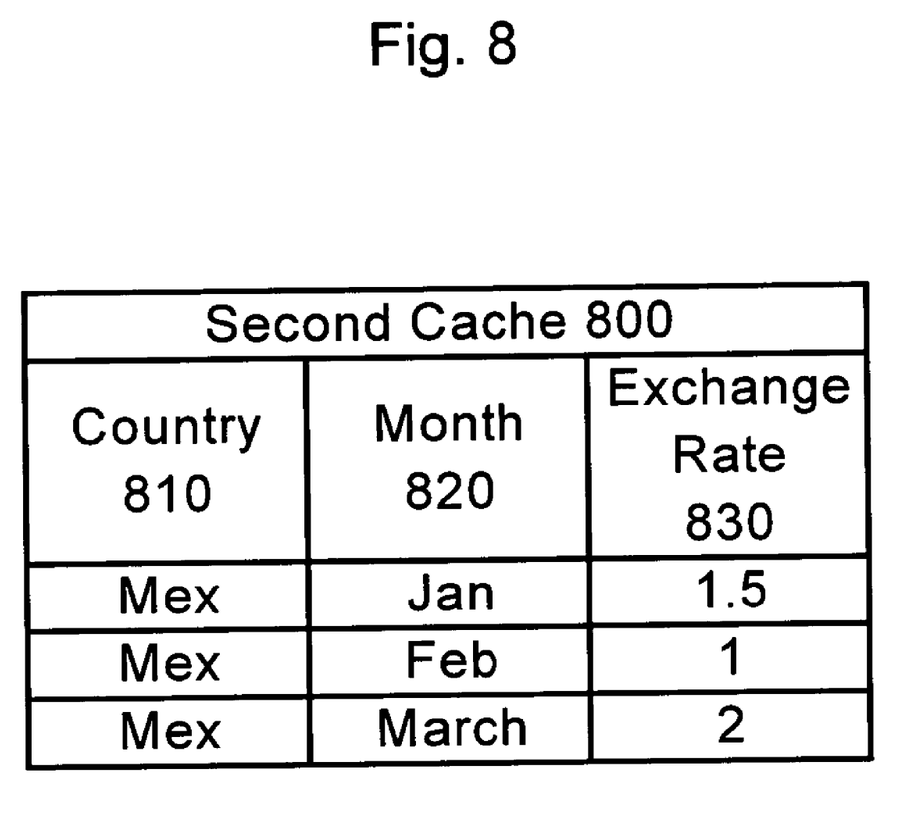
FIG. 8 is an exemplary second cache in accordance with the present invention.

At step 518, a second cache is retrieved from a second data table in database 200 corresponding to the second data type. The second cache includes data for the second measure over the selected range of attributes. An exemplary second cache 800 corresponding to the measure expression "US Sales" is shown in FIG. 8. Second cache 800 is retrieved from "Exchange" table 400 and includes "Country" column 810, "Month" column 820, and "Exchange Rate" column 830. "Country" column 810 includes entries for Mexico only, which comprises the selected range of location attributes. "Month" column 820 includes entries for January, February, and March only, which comprise the selected range of time attributes. As should be appreciated, second cache 800 does not include a "Customer ID" column because customer data is not applicable to the "Exchange" data type. "Exchange Rate" column 830 is a measure column that includes data for the measure "Exchange Rate" 430 according to countries and months in "Country" column 810 and "Month" column 820, respectively. Importantly, all rows in second cache 800 may be compiled through only a single access to "Exchange" table 400.

At step 520, a second index is generated from the second cache. The second index includes data for the second measure over the selected range of attributes common to the first data type and the second data type. Consequently, in the second index, data for the second measure is aggregated by attributes specific to the second measure. For "US Sales", because the second cache 800 includes only the location and time attributes common to both the "Sales" data type and the "Exchange" data type, the second index is identical to second cache 800.

At step 522, the arithmetic operation defined in the measure expression is performed on the data for the first measure from the first index and the data for the second measure from the second index. The operation is performed on a row by row basis, whereby each measure expression entry is calculated based on the first measure entry and the second measure entry from the corresponding row.

Figure 9:
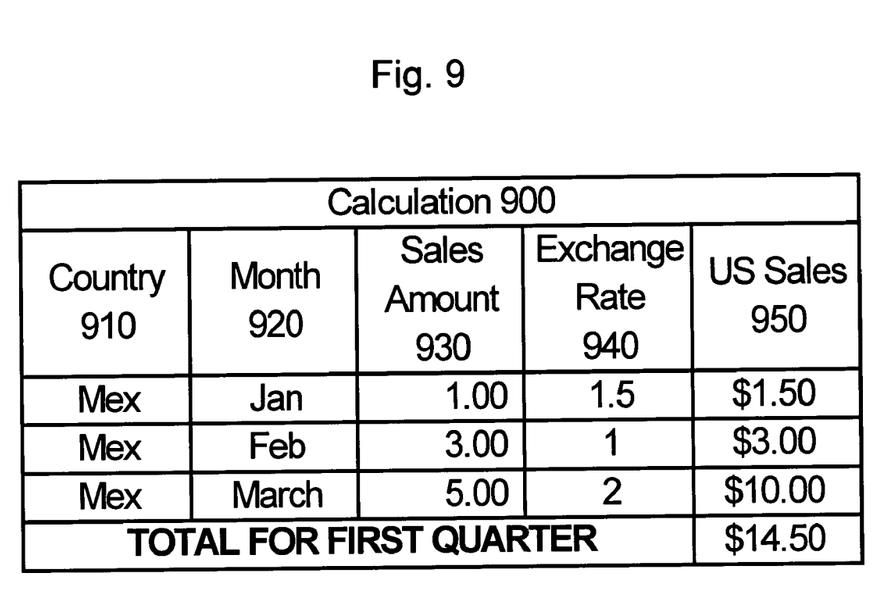
FIG. 9 is an exemplary calculation of a measure expression in accordance with the present invention.

An exemplary measure expression calculation 900 corresponding to the measure expression "US Sales" is shown in FIG. 9. Calculation 900 includes "Country" column 910, "Month" column 920, "Sales Amount" column 930, "Exchange Rate" column 940, and "US Sales" column 950. "Country" column 910 and "Month" column 920 are attribute columns corresponding to attributes common to both the "Sales" data type and the "Exchange" data type. "Sales Amount" column 730 and "Exchange Rate" column 940 are measure columns that include aggregated data for the measures "Sales Amount" 340 and "Exchange Rate" 430 from first index 700 and second index 800, respectively.

"US Sales" column 950 is a measure expression column that includes data for the measure expression "US Sales" according to countries and locations in "Country" columns 910 and "Month" column 920, respectively. Entries in "US Sales" 950 are calculated on a month by month basis as the product of the entries in "Sales Amount" column 930 and "Exchange Rate" column 940 for the corresponding month.

At step 524, the total measure expression for the selected range of attributes is calculated by aggregating the resulting measure expression entries for each row calculated at step 522. As shown in calculation 900, the total measure expression "US Sales" for the first quarter, "$14.50", is calculated by summing the individual measure expressions entries for each month in the first quarter.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for calculating a measure expression over a selected range of attributes, the measure expression including a relationship between a first measure and a second measure, the first measure corresponding to a first data type and the second measure corresponding to a second data type, the relationship defined by an arithmetic operation, the method comprising:
   receiving a request to calculate the measure expression over the selected range of attributes;
   responsive to receiving the request, querying a data store to retrieve a first data set corresponding to the first data type, the first data set including only data for the first measure over the selected range of attributes;
   storing the first data set in a first cache;
   generating a first index from the first cache, the first index including data for the first measure over the selected range of attributes common to the first data type and the second data type;
   responsive to receiving the request, querying the data store to retrieve a second data set corresponding to the second data type, the second data set including only data for the second measure over the selected range of attributes;
   storing the second data set in a second cache;
   generating a second index from the second cache, the second index including data for the second measure over the selected range of attributes common to the first data type and the second data type;

performing the arithmetic operation on the data for the first measure from the first index and the data for the second measure from the second index to achieve resulting data; and aggregating the resulting data over the selected range of attributes common to the first data type and the second data type.

2. The method of claim 1, wherein querying the data store to retrieve first data set comprises querying the data store to retrieve the first data set through a single access to a first data table.

3. The method of claim 1, wherein querying the data store to retrieve second data set comprises querying the data store to retrieve the second data set through a single access to a second data table.

4. The method of claim 1, wherein generating the first index comprises generating the first index including data for the first measure aggregated according to attributes specific to the first data type.

5. The method of claim 1, wherein generating the second index comprises generating the second index including data for the second measure aggregated according to attributes specific to the second data type.

6. A system for calculating a measure expression over a selected range of attributes, the measure expression including a relationship between a first measure and a second measure, the first measure corresponding to a first data type and the second measure corresponding to a second data type, the relationship defined by an arithmetic operation, the system comprising:

a data store for storing a first data table including data for the first data type and a second data table including data for the second data type;

a processor for performing the following steps:
receiving a request to calculate the measure expression over the selected range of attributes;

responsive to receiving the request, querying the data store to retrieve a first data set corresponding to the first data type, the first data set including only data for the first measure over the selected range of attributes;

storing the first data set in a first cache;

generating a first index from the first cache, the first index including data for the first measure over the selected range of attributes common to the first data type and the second data type;

responsive to receiving the request, querying the data store to retrieve the second data set corresponding to the second data type, the second data set including only data for the second measure over the selected range of attributes;

storing the second data set in a second cache;

generating a second index from the second cache, the second index including data for the second measure over the selected range of attributes common to the first data type and the second data type;

performing the arithmetic operation on the data for the first measure from the first index and the data for the second measure from the second index to achieve resulting data; and aggregating the resulting data over the selected range of attributes common to the first data type and the second data type.

7. The method of claim 6, wherein the first data set comprises data retrieved through a single access to the first data table.

8. The method of claim 6, wherein the second data set comprises data retrieved through a single access to the second data table.

9. The system of claim 6, wherein the first index comprises data for the first measure aggregated according to attributes specific to the first data type.

10. The system of claim 6, wherein the second index comprises data for the second measure aggregated according to attributes specific to the second data type.

11. A computer readable medium for calculating a measure expression over a selected range of attributes, the measure expression including a relationship between a first measure and a second measure, the first measure corresponding to a first data type and the second measure corresponding to a second data type, the relationship defined by an arithmetic operation, the computer readable medium having stored thereon computer executable instructions for performing the following steps:

receiving a request to calculate the measure expression over the selected range of attributes;

responsive to receiving the request, querying a data store to retrieve a first data set corresponding to the first data type, the first data set including data for the first measure over the selected range of attributes;

storing the first data set in a first cachet;

generating a first index from the first cache, the first index including data for the first measure over the selected range of attributes common to the first data type and the second data type;

responsive to receiving the request, querying the data store to retrieve a second data set corresponding to the second data type, the second data set including data for the second measure over the selected range of attributes;

storing the second data set in a second cache;

generating a second index from the second cache, the second index including data for the second measure over the selected range of attributes common to the first data type and the second data type;

performing the arithmetic operation on the data for the first measure from the first index and the data for the second measure from the second index to achieve resulting data; and aggregating the resulting data over the selected range of attributes common to the first data type and the second data type.

12. The computer readable medium of claim 11, wherein the computer executable instructions for querying the data store to retrieve first data set comprise computer executable instructions for querying the data store to retrieve the first data set through a single access to a first data table.

13. The computer readable medium of claim 11, wherein the computer executable instructions for querying the data store to retrieve second data set comprise computer executable instructions for querying the data store to retrieve the second data set through a single access to a second data table.

14. The computer readable medium of claim 11, wherein the computer executable instructions for generating the first index comprise computer executable instructions for generating the first index including data for the first measure aggregated according to attributes specific to the first data type.

15. The computer readable medium of claim 11, wherein the computer executable instructions for generating the second index comprise computer executable instructions for generating the second index including data for the second measure aggregated according to attributes specific to the second data type.

* * * * *